United States Patent
Heuer et al.

(10) Patent No.: US 10,227,018 B2
(45) Date of Patent: Mar. 12, 2019

(54) ESTABLISHING A CHARGING CONNECTION AND AN ASSOCIATED COMMUNICATION CONNECTION

(71) Applicant: Siemens Aktiengesellschaft, München (DE)

(72) Inventors: Jörg Heuer, Oberhaching (DE); Anton Schmitt, Vaterstetten (DE); Andreas Scholz, Unterschleißheim (DE); Martin Winter, Rosenheim (DE)

(73) Assignee: SIEMENS AKTIENGESELLSCHAFT (DE)

(*) Notice: Subject to any disclaimer, the term of this patent is extended or adjusted under 35 U.S.C. 154(b) by 184 days.

(21) Appl. No.: 15/129,918

(22) PCT Filed: Apr. 14, 2015

(86) PCT No.: PCT/EP2015/058054
§ 371 (c)(1),
(2) Date: Sep. 28, 2016

(87) PCT Pub. No.: WO2015/158704
PCT Pub. Date: Oct. 22, 2015

(65) Prior Publication Data
US 2017/0136909 A1 May 18, 2017

(30) Foreign Application Priority Data
Apr. 17, 2014 (DE) .................. 10 2014 207 440

(51) Int. Cl.
*H02J 7/00* (2006.01)
*B60L 11/18* (2006.01)

(52) U.S. Cl.
CPC ......... *B60L 11/1838* (2013.01); *B60L 11/182* (2013.01); *B60L 11/1825* (2013.01);
(Continued)

(58) Field of Classification Search
CPC ............... B60L 11/182; B60L 11/1824; B60L 11/1825; B60L 11/1838; B60L 11/1846; H02J 50/80; H02J 50/90; H02J 2007/0001
(Continued)

(56) References Cited

U.S. PATENT DOCUMENTS

2015/0022151 A1* 1/2015 Tabatowski-Bush ........................ B60L 11/1846
320/109

FOREIGN PATENT DOCUMENTS

| CN | 102118069 A | 7/2011 |
|---|---|---|
| DE | 102008009208 A1 | 8/2009 |

(Continued)

OTHER PUBLICATIONS

International Search Report for PCT Application No. PCT/EP2015/058054, dated Jul. 15, 2015.
(Continued)

*Primary Examiner* — Paul Dinh
(74) *Attorney, Agent, or Firm* — Schmeiser Olsen & Watts, LLP

(57) ABSTRACT

A device and method is provided that establishes a charging connection and a communication connection between a charging station and a vehicle, the vehicle having a first charging device and a first communication device, the charging station having a second charging device and a second communication device. The first charging device is positioned with respect to the second charging device in a way that energy for charging a battery of the vehicle is transmitted via the charging connection, and an orientation of the second communication device with respect to the first communication device, is such that the communication connection can carry out a wireless exchange of information in a way that reception of the information by a further
(Continued)

communication device is prevented. The first communication device and the second communication device are configured in a way that the information is emitted and/or received by means of at least one communication unit.

16 Claims, 2 Drawing Sheets

(52) U.S. Cl.
CPC ....... *B60L 11/1829* (2013.01); *B60L 11/1833* (2013.01); *B60L 11/1846* (2013.01); *B60L 2230/16* (2013.01); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
USPC .......................................................... 320/108
See application file for complete search history.

(56) References Cited

FOREIGN PATENT DOCUMENTS

| | | |
|---|---|---|
| DE | 102009021818 A1 | 11/2010 |
| DE | 102012012860 A1 | 1/2014 |
| DE | 102012216660 A1 | 3/2014 |
| DE | 102013209235 A1 | 11/2014 |
| EP | 2717428 A1 | 4/2014 |

OTHER PUBLICATIONS

Chinese language Office Action for Chinese Application No. 201580020243.4, dated Apr. 28, 2018.

\* cited by examiner

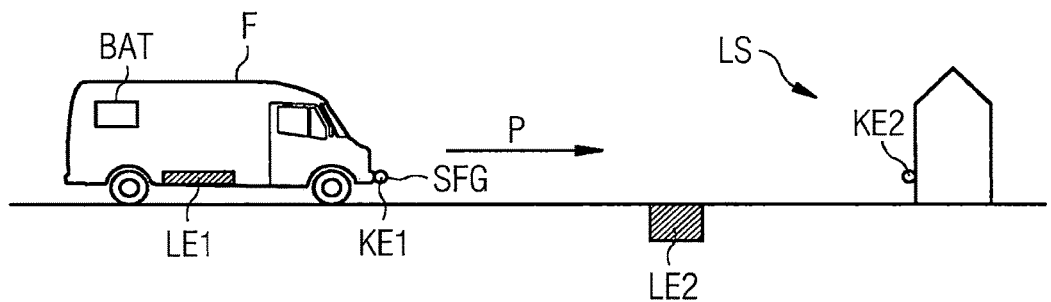
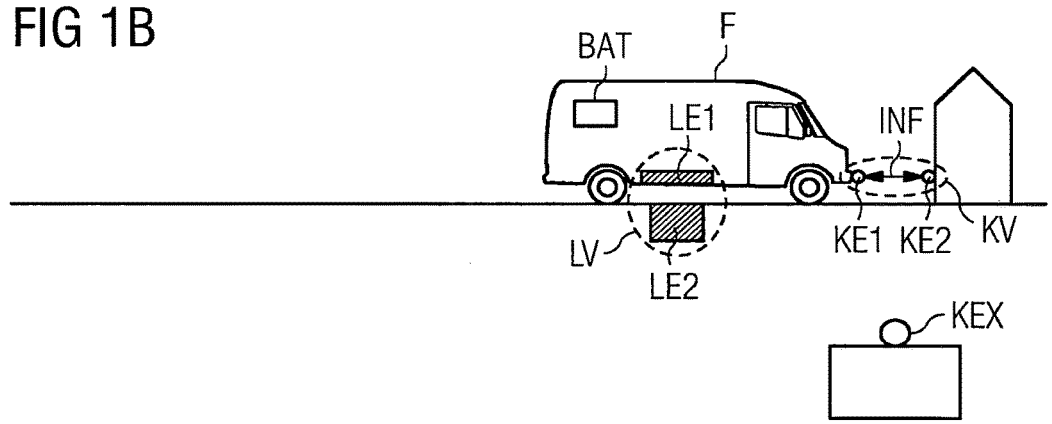
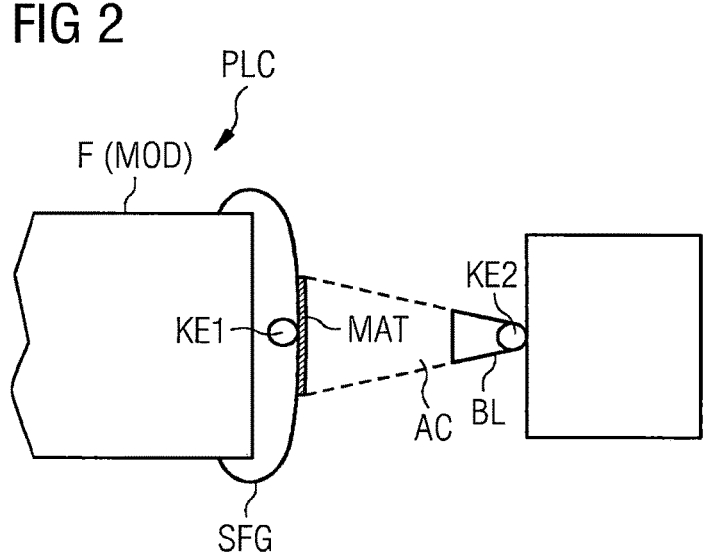

ESTABLISHING A CHARGING CONNECTION AND AN ASSOCIATED COMMUNICATION CONNECTION

CROSS-REFERENCE TO RELATED APPLICATIONS

This application claims priority to PCT Application No. PCT/EP2015/058054, having a filing date of Apr. 14, 2015, based off of German application No. DE 102014207440.1, having a filing date of Apr. 17, 2014, the entire contents of which are hereby incorporated by reference.

FIELD OF TECHNOLOGY

The following relates to methods and devices for establishing a charging connection and an associated communication connection.

BACKGROUND

At present, various concepts for charging electric vehicles at charging stations are being discussed. In this context, it is not only necessary to have a charging connection between the charging station and the vehicle via which electrical current can fed into the battery of the vehicle but also before, during and after the charging process, information must be exchanged between the charging station and the vehicle. This information relates, for example, to an authentication of the vehicle at the charging station, monitoring the charging process or also billing for the electrical energy procured after the charging process has ended.

In order to render communication between vehicle and charging station secure, that is to say in order to make it more difficult for an attacker to disturb the communication, it is known to conduct a communication connection via a charging cable which physically connects the charging station with the vehicle. In this context, it is disadvantageous, however, that, on the one hand, plugging the charging cable into the vehicle and into the charging station is complex and, on the other hand, the cable can be damaged, for example due to vandalism, and/or can be destroyed. For this purpose, it would be of advantage to render the charging connection as well as the communication connection wireless since the abovementioned disadvantages with the charging cable can be avoided by this means.

SUMMARY

An aspect relates to specifying methods and devices which guarantee an establishment of a charging connection and of an associated communication connection in such a manner that association of the charging connection and of the communication connection, and thus a manipulation of the association of the charging connection and of the communication connection is avoided.

Embodiments of the invention relate to a method for establishing a charging connection and an associated communication connection between a charging station and a vehicle, the vehicle having a first charging device and a first communication direction and the charging station having a second charging device and a second communication device, characterized in that the method passes through the following steps:
positioning the first charging device with respect to the second charging device in such a manner that energy for charging a battery of the vehicle can be transmitted via the charging connection;
orienting the second communication device with respect to the first communication device, after performing the positioning, in such a manner that a wireless exchange of information can be performed by the communication connection in such a manner that a reception of information by a further communication device is prevented;
configuring the first communication device and the second communication device in such a manner that the information is sent out and/or received by means of in each case at least one communication unit.

In this embodiment of the invention, the at least one communication unit can be designed as an ultrasonic unit, a radar unit, an ultrasonic sensor or a radar sensor.

This method is advantageous since components of the vehicle which are already present, such as, e.g., the ultrasonic sensors or radar sensors, can be used for the communication between vehicle and charging column. This presents a cost-effective solution. In addition, reliable communication can be provided for between the vehicle and the charging column due to the specific arrangement of the first and second communication device, which can then provide for securing an authorized transmission of energy via the charging connection, e.g. by means of authorization and authentication. In addition, a start of the energy transmission via the charging connection can only be permitted after the communication connection has been established.

A particular advantage of embodiments of the invention is achieved by the fact that the at least one communication unit is used integrated in a front of the vehicle, particularly in a bumper. By this means, no external reconstructions are necessary at the vehicle as result of which the method can be implemented cost-effectively.

In an advantageous development of embodiments of the invention, a radiation characteristic of the at least one communication unit of the second communication device is configured in such a manner that radiated signals impinge on at least one of the communication units of the first communication device. By this means, a communication is designed to be more reliable since due to the development, compromising the communication between vehicle and charging column is hampered further.

As part of this development, the radiation characteristic, after the positioning, can be adjusted individually in dependence on at least one of the following conditions:
position of the first communication device with respect to the second communication device;
model of the vehicle;
surface condition of an environment of the first communication device.

This further increases a security in the establishment of the communication connection. It hampers the attack of an attacker of the communication connection and of the charging connection.

In a further development of the method, a distance between the first and second communication device, before establishing the communication connection, is reduced by guiding the second communication device in the direction of the first communication device. This procedure, too, results in a further improvement of a secure communication connection since disturbing or compromising the communication connection is hampered further.

In a preferred development of embodiments of the invention, at least a first communication unit from a number of communication units of the first communication device is selected in such a manner that the at least one first communication unit has a shorter distance from the second communication device with respect to the further number of communication units. This achieves a further enhancement of a security of the communication connection since a local region between vehicle and charging column in which the waves of the communication units are transmitted is restricted further.

Embodiments of the invention also relates to a second communication device of a charging station for establishing a communication connection, associated with a charging connection, between the charging station and a vehicle, wherein the vehicle has a first charging device and a first communication direction and the charging station has, apart from the second charging device, and a second communication device, characterized by the following units:

first unit for establishing the charging connection after positioning the first charging device with respect to the second charging device in such a manner that energy for charging a battery of the vehicle can be transmitted via the charging connection;

second unit for orienting the second communication device with respect to the first communication device after performing the positioning, in such a manner that a wireless exchange of information can be performed by the communication connection, in such a manner that a reception of the information by a further communication device is prevented;

third unit for configuring the second communication device with respect to the first communication device in such a manner that the information can be sent out and/or received by means of in each case at least one communication unit.

In this context, the at least one communication unit can be designed as an ultrasonic unit, a radar unit, an ultrasonic sensor or a radar sensor.

In addition, the second communication device can have a fourth unit, wherein at least one of the method steps represented before can be implemented and executed by means of the fourth unit.

The advantages of the second communication device are analogous to the advantages of the method.

In addition, embodiments of the invention also relates to a first communication device of a vehicle for establishing a communication connection, associated with a charging connection, between a charging station and the vehicle, wherein the vehicle has a first charging direction and the first communication direction and the charging station has a second charging device and a second communication device, characterized by the following units:

fifth unit for positioning the first charging device with respect to the second charging device in such a manner that energy for charging a battery of the vehicle can be transmitted via the charging connection;

sixth unit for orienting the first communication device with respect to the second communication device after performing the positioning, in such a manner that a wireless exchange of information can be performed by the communication connection in such a manner that a reception of the information by a further communication device is prevented;

seventh unit for configuring the first communication device with respect to the second communication device in such a manner that the information can be sent out and/or received by means of in each case at least one communication unit.

In this context, the at least one communication unit can be designed as an ultrasonic unit, a radar unit, an ultrasonic sensor or a radar sensor.

The first communication device can also have an eighth unit, wherein at least one of the method steps presented previously can be implemented and executed by means of the eighth unit.

The advantages of the first communication device are analogous to the advantages of the method.

Finally, embodiments of the invention comprise a system having a first communication device and a second communication device. The advantages are analogous to the advantages of the method.

BRIEF DESCRIPTION

Some of the embodiments will be described in detail, with reference to the following figures, wherein like designations denote like members, wherein:

FIG. 1a shows an approach situation of an electric vehicle in the direction of a charging station;

FIG. 1b shows a charging situation in which the vehicle is positioned at the charging station for charging its battery;

FIG. 2 shows a set-up of a communication connection having a first and a second communication device.

Figure 3:
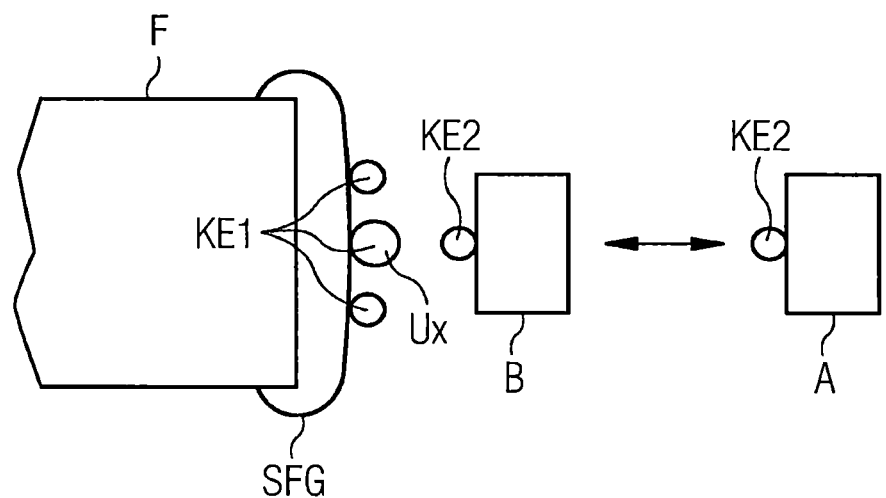
FIG. 3 shows a variant of a set-up of a communication connection having the first and second communication device.

Elements having the same function and operation are provided with the same reference symbol in the figures.

DETAILED DESCRIPTION

The following examples represent embodiments of the invention by means of ultrasonic units or ultrasonic sensors, respectively. Instead of ultrasonic units, other communication units such as, e.g., radar units or radar sensors or units or sensors communicating in a different frequency band from ultrasound and radar can be used.

FIG. 1a shows an approach situation of a vehicle F in the direction of a charging station LS. The vehicle F has a first charging device LE1 for accepting electrical energy for charging its battery BAT. In addition, the vehicle has a first communication device KE1 which, in this example, is attached to the bumper of the vehicle. As indicated with an arrow P, the vehicle is moving in the direction of the charging station.

The charging station has a second charging device LE2 which, after successful positioning of the first charging device over the second charging device can transmit electrical energy to the first charging device for charging the battery of the vehicle, for example inductively. In addition, the charging station has a second communication device KE2, in order to be able to subsequently also establish a communication connection KV with the first communication device of the vehicle.

Before the communication connection can be set up, the vehicle must position its first charging device positionally accurately over the second charging device of the charging station. It is only when this positioning has been concluded successfully, that a communication can be established via the communication connection. For this purpose, the second communication device is oriented with respect to the first communication device, alternatively also the first communication device with respect to the second communication device, after performance of the positioning, in such a manner that the communication connection is arranged for the wireless exchange of information INF. The orientation takes place in such a manner that when the communication connection is established, the information is receivable only between the first and second communication device so that further communication devices KEX cannot receive the information.

FIG. 2 shows an arrangement of the first and second communication device in the form that by this means, a reception of information by the further communication device is prevented. In the present example, the first and the second communication devices have in each case at least one ultrasonic unit which can in each case send and/or receive information. The ultrasonic unit can be designed as ultrasonic sensor. To prevent intercepting of the information by the further communication device, the second communication device restricts a radiation characteristic AC of the at least one ultrasonic unit in such a manner that it can only be received in a narrowly delimited environment of the ultrasonic unit of the first communication device, for example in a radius around the first communication device of 5 cm.

To influence the disconnection characteristic of a signal, the second communication device can survey, for example, the position of the first communication device. This can be done, for example, by the ultrasonic unit itself since the signal, as a rule, after being radiated, is reflected from the surface of the vehicle and the second communication device, as a result, can determine a propagation time of the forward and return signal. Depending on the distance determined, a distance between the first and the second communication device can be actively reduced in that the second communication device is positioned closer to the first communication device. This can be seen in FIG. 3 in which the second communication device is firstly pushed to position A and then, after determination of the distance between first and second communication device, for example to 5 cm distance from the first communication device on position B.

In an alternative or additional embodiment, the model of the vehicle and thus a position of the first communication device which is specific of a respective model of a vehicle, can be recognized by the charging station. The recognition can be performed, for example, with the aid of a video camera and downstream pattern processing in the charging station. Depending on the recognized model and thus on the position of the first communication device, a position of the second communication device, for example a distance or a height of the disconnection characteristic above ground can be adapted in dependence on the model of the respective vehicle.

Furthermore, a surface condition in an environment of the first communication device can be determined by the second communication device. In this context, it is possible to infer, for example with the aid of the reflection characteristics of the ultrasonic wave radiated by the second communication device, which is reflected by the surface of the vehicle, a surface condition of the vehicle.

Furthermore, the surface condition in the environment of the first communication device can also be determined on the basis of the model of the vehicle. Depending on the surface condition of the environment, the disconnection characteristic is changed in order to avoid unwanted radiation of information to other communication devices, for example by reducing the distance of the second communication device from the second communication device or by delimiting a radiation angle of the ultrasonic waves by the second communication device.

At present, vehicles are equipped with a number of ultrasonic units, e.g. in the bumper, in order to inform, for example, a vehicle driver about obstacles before or behind the vehicle during parking. In order to increase security in the communication between the first and second communication device, it is possible to use only one or two of the number of ultrasonic units in the first communication device for exchanging information. In particular, the ultrasonic unit or the ultrasonic units, respectively, of the first communication device can be active which have the shortest distance from the at least one ultrasonic unit of the second communication device, e.g., the two of the ultrasonic units of the first communication device are selected which, in comparison with the other ultrasonic units of the first communication device, have a shortest distance from the at least one ultrasonic unit of the second communication device.

The second communication device can be implemented by the following units:

first unit E1 for establishing the charging connection LV after positioning the first charging device LE1 with respect to the second charging device LE2, in such a manner that energy for charging a battery BAT of the vehicle F can be transmitted via the charging connection LV;

second unit E2 for orienting the second communication device KE2 with respect to the first communication device KE1 after performing the positioning, in such a manner that a wireless exchange of information INF can be performed by the communication connection KV in such a manner that a reception of information INF by a further communication device KEX is prevented;

third unit E3 for configuring the second communication device KE2 with respect to the first communication device KE1, in such a manner that the information INF can be sent out and/or received by means of in each case at least one communication unit.

Furthermore, the second communication device KE2 can have a fourth unit E4 wherein developments and alternatives of embodiments of the invention can be implemented and executed by means of the fourth unit E4.

The first communication device KE1 can be implemented and achieved by the following units:

fifth unit E5 for positioning the first charging device LE1 with respect to the second charging device LE2 in such a manner that energy for charging a battery BAT of the vehicle F can be transmitted via the charging connection LV;

sixth unit E6 for orienting the first communication device KE1 with respect to the second communication device KE2 after performing the positioning, in such a manner that a wireless exchange of information INF can be performed by the communication connection KV in such a manner that a reception of the information INF by a further communication device KEX is prevented;

seventh unit E7 for configuring the first communication device KE1 with respect to the second communication device KE2, in such a manner that the information INF can be sent out and/or received by means of in each case at least one communication unit.

Furthermore, the first communication device KE1 can have an eighth unit E8, wherein developments and alternatives of embodiments of the invention can be implemented and executed by means of the eighth unit E8.

Figure 4:
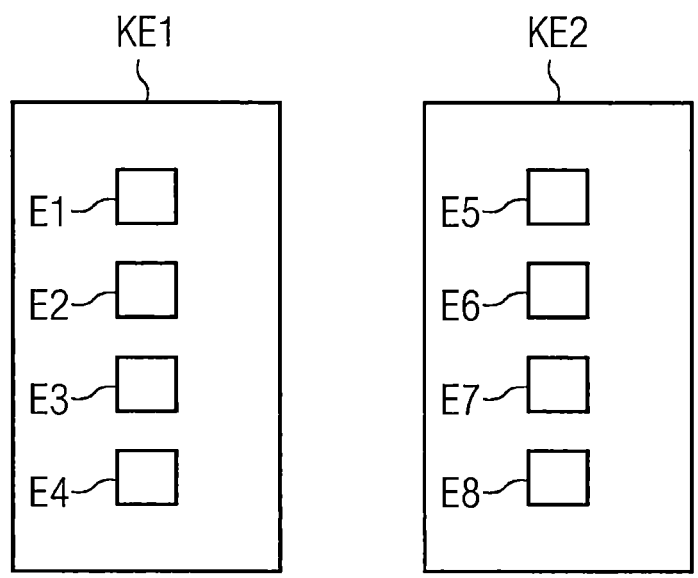
FIG. 4 shows a respective set-up of the first and second communication device.

The units of the first and second communication device, see FIG. 4, can be implemented and achieved at least partially in software and/or in a combination of software and hardware. In this context, the components of the units, which are implemented in software, can be implemented in the form of machine-readable code, wherein this code can be deposited in a storage unit and transmitted from there via connection to at least one processor for execution. In addition, an input and/or output unit can also be connected to the processor via which the processor exchanges information with communication units, e.g. about the ultrasonic sensors.

Embodiments of the invention can be used in the environment of an electrical filling-up of vehicles such as an electric wheelchair, electric car, electric bus or electric truck. Within the context of embodiments of the invention, a vehicle is also understood to be any type of self-moving unit such as, e.g., autonomously acting vacuum cleaner, service robot, boats, ships and the like.

The invention claimed is:

1. A method for establishing a charging connection and an associated communication connection between a charging station and a vehicle, the vehicle having a first charging device and a first communication device and the charging station having a second charging device and a second communication device, the method comprising:
    positioning the first charging device with respect to the second charging device in such a manner that the second charging device is in position to transmit and the first charging device is in position to receive energy for charging a battery of the vehicle via the charging connection;
    orienting the second communication device with respect to the first communication device, after performing the positioning, in such a manner that a wireless exchange of information is performed by the communication connection in such a manner that a reception of information by a further communication device is prevented; and
    configuring the first communication device and the second communication device in such a manner that the information is sent out and/or received by means of at least one communication unit,
wherein the communication unit is one of an ultrasonic unit, a radar unit, an ultrasonic sensor, and a radar sensor, and wherein wireless exchange of information only takes place when the positioning has occurred.

2. The method as claimed in claim 1, wherein, the at least one communication unit is an obstacle detection unit.

3. The method as claimed in claim 1, wherein the at least one communication unit is used integrated in a front of the vehicle.

4. The method as claimed in claim 1, wherein a radiation characteristic of the at least one communication unit of the second communication device is configured in such a manner that radiated signals impinge on at least one of the communication units of the first communication device.

5. The method as claimed in claim 4, wherein the radiation characteristic, after the positioning, is adjusted individually in dependence on at least one of the following conditions: position of the first communication device with respect to the second communication device; model of the vehicle; surface condition of an environment of the first communication device.

6. The method as claimed in claim 1, wherein a distance between the first communication device and the second communication device, before establishing the communication connection, is reduced by guiding the second communication device in a direction of the first communication device.

7. The method as claimed in claim 1, wherein a first communication unit from a number of communication units of the first communication device is selected in such a manner that the first communication unit has a shortest distance from the second communication device with respect to the number of communication units.

8. A second communication device of a charging station for establishing a communication connection, associated with a charging connection, between the charging station and a vehicle, wherein the vehicle has a first charging device and a first communication device and the charging station has, apart from the second charging device, a second communication device, the second communication device comprising:
    a first unit for establishing the charging connection after positioning the first charging device with respect to the second charging device in such a manner that the second charging device is in position to transmit and the first charging device is in position to receive energy for charging a battery of the vehicle via the charging connection;
    a second unit for orienting the second communication device with respect to the first communication device after performing the positioning, in such a manner that a wireless exchange of information is performed by the communication connection, in such a manner that a reception of the information by a further communication device is prevented; and
    a third unit for configuring the second communication device with respect to the first communication device in such a manner that the information is sent out and/or received by means of at least one communication unit,
wherein the communication unit is one of an ultrasonic unit, a radar unit, an ultrasonic sensor, and a radar sensor, and wherein wireless exchange of information only takes place when the positioning has occurred.

9. The second communication device as claimed in claim 8, wherein the at least one communication unit is an ultrasonic unit, a radar unit, an ultrasonic sensor or a radar sensor.

10. The second communication device as claimed in claim 8, further comprising a fourth unit capable of performing the function of at least one of the first unit, the second unit, and the third unit.

11. A first communication device of a vehicle for establishing a communication connection, associated with a charging connection, between a charging station and the vehicle, wherein the vehicle has a first charging device and the first communication device and the charging station has a second charging device and a second communication device, the first communication device comprising:
    a first unit for positioning the first charging device with respect to the second charging device in such a manner that the second charging device is in position to transmit and the first charging device is in position to receive energy for charging a battery of the vehicle via the charging connection;
    a second unit for orienting the first communication device with respect to the second communication device after performing the positioning, in such a manner that a wireless exchange of information is performed by the communication connection in such a manner that a reception of the information by a further communication device is prevented; and a third unit for configuring the first communication device with respect to the second communication device in such a manner that the information is sent out and/or received by means of at least one communication unit, wherein the communication unit is one of an ultrasonic unit, a radar unit, an ultrasonic sensor, and a radar sensor, and wherein wireless exchange of information only takes place when the positioning has occurred.

12. The first communication device as claimed in claim 11, wherein the at least one communication unit is designed as an ultrasonic unit, a radar unit, an ultrasonic sensor or a radar sensor.

13. The first communication device as claimed in claim 11, further comprising a fourth unit capable of performing the function of at least one of the first unit, the second unit, and the third unit.

14. A system comprising a first communication device as claimed in claim 11, and a second communication device.

15. The method as claimed in claim 1, wherein preventing reception of information by the further communication device is accomplished by restricting a radiation characteristic of at least one of the first and second communication units such that the information can only be received in a narrowly delimited environment of the respective communication unit.

16. The method of claim 15, wherein the narrowly delimited environment is a radius of 5 cm around the respective communication unit.

\* \* \* \* \*